(12) United States Patent
Miyamae (10) Patent No.: US 8,602,562 B2
(45) Date of Patent: *Dec. 10, 2013

(54) PROJECTOR INCLUDING A FIRST AND A SECOND SOLID STATE LIGHT SOURCE

(75) Inventor: Akira Miyamae, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 12/827,342

(22) Filed: Jun. 30, 2010

(65) Prior Publication Data

US 2011/0043761 A1   Feb. 24, 2011

(30) Foreign Application Priority Data

Aug. 20, 2009   (JP) ................................. 2009-190760

(51) Int. Cl.
   *G03B 21/14*   (2006.01)

(52) U.S. Cl.
   USPC ............................................. 353/20; 353/31

(58) Field of Classification Search
   USPC ............................................. 353/20, 30, 31
   See application file for complete search history.

(56) References Cited

U.S. PATENT DOCUMENTS

| | | | |
|---|---|---|---|
| 5,247,339 A * | 9/1993 | Ogino .............................. | 356/73 |
| 6,319,425 B1 | 11/2001 | Tasaki et al. | |
| 6,747,710 B2 | 6/2004 | Hall, Jr. et al. | |
| 6,961,179 B2 | 11/2005 | Chen et al. | |
| 7,005,679 B2 | 2/2006 | Tarsa et al. | |
| 7,070,300 B2 | 7/2006 | Harbers et al. | |
| 7,258,453 B2 | 8/2007 | Inamoto | |
| 7,475,993 B2 | 1/2009 | Takeda | |
| 7,547,114 B2 * | 6/2009 | Li et al. .......................... | 362/231 |
| 8,026,659 B2 | 9/2011 | Tang et al. | |
| 8,096,668 B2 | 1/2012 | Abu-Ageel | |
| 8,287,132 B2 | 10/2012 | Miyamae et al. | |
| 8,382,288 B2 | 2/2013 | Narimatsu et al. | |
| 2006/0001838 A1 | 1/2006 | Yoshii et al. | |

(Continued)

FOREIGN PATENT DOCUMENTS

| | | |
|---|---|---|
| CN | 1885095 A | 12/2006 |
| CN | 1892285 A | 1/2007 |

(Continued)

OTHER PUBLICATIONS

Jul. 2, 2012 Notice of Allowance issued in U.S. Appl. No. 12/827,579.

(Continued)

*Primary Examiner* — Thanh Luu
*Assistant Examiner* — Renee Naphas
(74) *Attorney, Agent, or Firm* — Oliff & Berridge, PLC (57) ABSTRACT

A projector includes: a first solid-state light source device which includes a first solid-state light source emitting excitation light, and a fluorescent layer converting excitation light emitted from the first solid-state light source to light including a first color light component and a second color light component different from the first color light component, and emitting converted light; a second solid-state light source device which includes a second solid-state light source emitting a third color light component different from the first color light component and the second color light component; a light modulation device modulating the first color light component, the second color light component, and the third color light component in accordance with image information; and a projection optical system projecting the modulated light components from the light modulation device as a projection image.

16 Claims, 8 Drawing Sheets

(56) References Cited

U.S. PATENT DOCUMENTS

| | | | |
|---|---|---|---|
| 2006/0262514 A1 | 11/2006 | Conner et al. | |
| 2007/0023777 A1* | 2/2007 | Sonobe et al. | 257/103 |
| 2008/0079905 A1* | 4/2008 | Maeda et al. | 353/31 |
| 2008/0100804 A1* | 5/2008 | Kanayama et al. | 353/20 |
| 2008/0151196 A1 | 6/2008 | Kinoshita | |
| 2008/0259224 A1 | 10/2008 | Roth | |
| 2009/0034284 A1 | 2/2009 | Li et al. | |
| 2009/0128781 A1 | 5/2009 | Li | |
| 2009/0284148 A1 | 11/2009 | Iwanaga | |
| 2010/0149222 A1 | 6/2010 | Welford et al. | |
| 2010/0231863 A1 | 9/2010 | Hikmet et al. | |
| 2011/0051095 A1* | 3/2011 | Narimatsu et al. | 353/31 |
| 2011/0228232 A1* | 9/2011 | Sakata et al. | 353/31 |

FOREIGN PATENT DOCUMENTS

| | | |
|---|---|---|
| CN | 101471533 A | 7/2009 |
| JP | A-2002-268140 | 9/2002 |
| JP | 2002-287247 A | 10/2002 |
| JP | A-2004-252253 | 9/2004 |
| JP | A-2004-327361 | 11/2004 |
| JP | A-2005-274957 | 10/2005 |
| JP | A-2005-347263 | 12/2005 |
| JP | A-2006-084990 | 3/2006 |
| JP | A-2007-199538 | 8/2007 |
| JP | A-2009-150938 | 7/2009 |
| WO | WO 2009/047683 A2 | 4/2009 |
| WO | WO 2009/091610 A9 | 7/2009 |

OTHER PUBLICATIONS

May 31, 2012 Office Action issued in U.S. Appl. No. 12/827,260.

Oct. 29, 2012 Notice of Allowance issued in U.S. Appl. No. 12/827,260.

U.S. Appl. No. 12/827,579 in the name of Miyamae filed Jun. 30, 2010.

U.S. Appl. No. 12/827,260 in the name of Narimatsu filed Jun. 30, 2010.

* cited by examiner

PROJECTOR INCLUDING A FIRST AND A SECOND SOLID STATE LIGHT SOURCE

BACKGROUND

1. Technical Field

The present invention relates to a projector, and in particular, to a projector using a solid-state light source.

2. Related Art

A projector is known which includes a single solid-state light source device emitting white light, a color separating and guiding optical system separating light from the single solid-state light source device into a red light component, a green light component, and a blue light component, a light modulation device modulating the respective color light components from the color separating and guiding optical system in accordance with image information, and a projection optical system projecting the modulated light components from the light modulation device as a projection image (for example, see JP-A-2005-274957). According to the projector described in JP-A-2005-274957, the three color light components which are obtained by separating white light emitted from the single solid-state light source device are used as the three color light components (red light component, green light component, and blue light component) which are modulated by the light modulation device. Unlike a projector which includes three solid-state light source devices, the light-emission efficiency (brightness per unit power) or the temperature characteristic (the change of light amount with change in temperature) does not differ between the solid-state light source devices. As a result, the color balance of the projection image can be stabilized.

A projector is also known which includes a solid-state light source device emitting a red light component, a solid-state light source device emitting a green light component, a solid-state light source device emitting a blue light component, a light modulation device modulating the color light components from the respective solid-state light source devices in accordance with image information, and a projection optical system projecting the modulated light components from the light modulation device as a projection image (for example, see JP-A-2002-268140). According to the projector described in JP-A-2002-268140, the three color light components which are emitted from the solid-state light source device emitting a red light component, the solid-state light source device emitting a green light component, and the solid-state light source device emitting a blue light component are used as the three color light components (red light component, green light component, and blue light component) which are modulated by the light modulation device. Thus, the projection image can be brightened compared to a projector which includes a single solid-state light source device.

However, according to the projector described in JP-A-2005-274957, since white light including a red light component, a green light component, and a blue light component is generated from the single solid-state light source device, unlike a projector which includes three solid-state light source devices, a significant thermal load is concentrated on the single solid-state light source device. As a result, it is difficult to further brighten the projection image.

According to the projector described in JP-A-2002-268140, it is difficult to make the three solid-state light source devices respectively emitting the red light component, the green light component, and the blue light component (the solid-state light source device emitting the red light component, the solid-state light source device emitting the green light component, and the solid-state light source device emitting the blue light component) the same light-emission efficiency or temperature characteristic. For this reason, it is difficult to stabilize the color balance of the projection image.

SUMMARY

An advantage of some aspects of the invention is that it provides a projector capable of brightening a projection image compared to a projector including a single solid-state light source device, and stabilizing the color balance of the projection image compared to a projector including three solid-state light source devices.

A projector according to an aspect of the invention includes a first solid-state light source device which includes a first solid-state light source emitting excitation light, and a fluorescent layer converting excitation light emitted from the first solid-state light source to light including a first color light component and a second color light component different from the first color light component, and emitting converted light, a second solid-state light source device which includes a second solid-state light source emitting a third color light component different from the first color light component and the second color light component, a light modulation device modulating the first color light component, the second color light component, and the third color light component in accordance with image information, and a projection optical system projecting the modulated light components from the light modulation device as a projection image.

According to this projector, the two color light components (first color light component and second color light component) emitted from the first solid-state light source device and the one color light component (third color light component) emitted from the second solid-state light source device are used as the three color light components (red light component, green light component, and blue light component) which are modulated by the light modulation device. Therefore, the thermal load imposed on the respective solid-state light source devices can be reduced compared to a projector which includes a single solid-state light source device. As a result, the projection image can be brightened compared to a projector which includes a single solid-state light source device.

According to this projector, two color light components (first color light component and second color light component) from among the three color light components (red light component, green light component, and blue light component) which are modulated by the light modulation device are generated by using the same solid-state light source (first solid-state light source). Therefore, the color balance of the projection image can be stabilized compared to a projector which includes three solid-state light source devices.

As a result, the projector according to the aspect of the invention can brighten the projection image compared to a projector which includes a single solid-state light source device, and can stabilize the color balance of the projection image compared to a projector which includes three solid-state light source devices.

In the projector according to the aspect of the invention, excitation light may be a blue light component, the first color light component may be a red light component, the second color light component may be a green light component, and the third color light component may be a blue light component.

With this configuration, light including a red light component and a green light component can be emitted from the first solid-state light source device by using the first solid-state light source emitting a blue light component.

Meanwhile, there is a problem in that a solid-state light source which is used in a solid-state light source device emitting a green light component has relatively low light-emission efficiency compared to a solid-state light source which is used in a solid-state light source device emitting a red light component and a solid-state light source which is used in a solid-state light source device emitting a blue light component. In contrast, the projector according to the aspect of the invention is configured such that a green light component is generated by using the first solid-state light source (emitting a blue light component) which has high light-emission efficiency compared to a solid-state light source which is used in a solid-state light source device emitting a green light component. Therefore, the light-emission efficiency can be increased compared to a case where a solid-state light source device emitting a green light component is used.

In the projector according to the aspect of the invention, the first solid-state light source and the second solid-state light source may have the same temperature characteristic.

With this configuration, with regard to all of the color light components, change in the light amount with change in temperature can be made the same. Therefore, the color balance of the projection image can be further stabilized.

In the projector according to the aspect of the invention, excitation light may be ultraviolet light, the first color light component may be a red light component, the second color light component may be a green light component, and the third color light component may be a blue light component.

With this configuration, light including a red light component and a green light component can be emitted from the first solid-state light source device by using the first solid-state light source emitting ultraviolet light.

A green light component is generated by using the first solid-state light source (emitting ultraviolet light) which has high light-emission efficiency compared to a solid-state light source which is used in a solid-state light source device emitting a green light component. Therefore, the light-emission efficiency can be increased compared to a case where a solid-state light source device emitting a green light component is used.

Various kinds of fluorescent materials are known to efficiently convert ultraviolet light, thus the selection width of a fluorescent material in the fluorescent layer is widened.

In the projector according to the aspect of the invention, the fluorescent layer may be formed of a layer containing a YAG-based fluorescent material, a silicate-based fluorescent material, or a TAG-based fluorescent material.

The above-described fluorescent material can efficiently convert excitation light to light including a red light component and a green light component, and can emit converted light. Further, the fluorescent material itself has high reliability. Therefore, with the above-described configuration, the projection image can be further brightened, and thus a high-reliable projector can be provided.

The YAG-based fluorescent material refers to a fluorescent material, such as $(Y,Gd)_3(Al,Ga)_5O_{12}:Ce$, which has a garnet crystal structure and is based on composite oxide of yttrium and aluminum.

The silicate-based fluorescent material refers to a fluorescent material, such as $(Ca,Sr,Ba)SiO_4:Eu$, which is based on silicate salt (silicate) with various components introduced.

The TAG-based fluorescent material refers to a fluorescent material, such as $Tb_3Al_5O_{12}:Ce$, which has a garnet crystal structure and is based on composite oxide of terbium and aluminum.

In the projector according to the aspect of the invention, a function may be provided to remove a yellow light component from light from the first solid-state light source device.

With this configuration, the yellow light component can be removed from light from the first solid-state light source device. As a result, color reproducibility can be prevented from being deteriorated due to the yellow light component.

In the projector according to the aspect of the invention, a function may not be provided to remove a yellow light component from light from the first solid-state light source device. In this case, the yellow light component which may be included in light from the first solid-state light source device can be positively used, and a brighter projection image can be projected.

In the projector according to the aspect of the invention, a function may be provided to remove excitation light from light from the first solid-state light source device.

Meanwhile, in the projector according to the aspect of the invention, part of excitation light emitted from the first solid-state light source device may transmit the fluorescent layer directly, which may cause deterioration in color reproducibility or deterioration of the light modulation device.

However, with the above-described configuration, excitation light can be removed from light from the first solid-state light source device. As a result, color reproducibility or the light modulation device can be prevented from being deteriorated due to excitation light.

The projector according to the aspect of the invention may further include an excitation light reflection optical system separating light emitted from the fluorescent layer and excitation light emitted while being not converted by the fluorescent layer, and returning excitation light emitted while being not converted toward the fluorescent layer.

Meanwhile, in the projector according to the aspect of the invention, part of excitation light emitted from the first solid-state light source device may transmit the fluorescent layer directly, which may cause degradation in light use efficiency, or deterioration in color reproducibility or deterioration of the light modulation device.

However, with the above-described configuration, excitation light having transmitted the fluorescent layer while being not converted is input again to the fluorescent layer and excitation light is reused, such that light use efficiency can be improved, and consequently the projection image can be further brightened. Further, with the above-described configuration, excitation light can be removed from light from the first solid-state light source device. As a result, color reproducibility or the light modulation device can be prevented from being deteriorated due to excitation light.

The projector according to the aspect of the invention may further include a collimation optical system parallelizing light emitted from the first solid-state light source device. The excitation light reflection optical system may be located at the back of the collimation optical system.

With this configuration, excitation light transmits the fluorescent layer directly and is converted to parallel light by the collimation optical system. Then, parallel light is reflected by the excitation light reflection optical system, is focused by the collimation optical system, and is efficiently input to the light-emission region of the fluorescent layer. Therefore, it is possible to suppress the spread of the light-emission region due to the excitation light reflection optical system being further provided.

The projector according to the aspect of the invention may further include a reflection-type polarizing plate directly transmitting one polarized component from among polarized components included in light emitted from the first solid-state light source device, and reflecting another polarized component toward the fluorescent layer.

Meanwhile, when the light modulation device of the projector is a light modulation device which uses a liquid crystal light modulation device, in general, only one polarized component from among the polarized components included in light is used for modulation, and another polarized component is not used for modulation. Thus, when a light source which emits light including one polarized component and another polarized component is used as the light source of the projector, it is necessary to remove another polarized component by an incidence-side polarizing plate, which causes degradation in light use efficiency.

In contrast, with the above-described configuration, another polarized component is returned to the fluorescent layer and reflected by the surface of the fluorescent layer. Thus, part of another polarized component is converted to one polarized component and reused, such that light use efficiency can be improved, and consequently the projection image can be further brightened.

The projector according to the aspect of the invention may further include a collimation optical system parallelizing light emitted from the first solid-state light source device. The reflection-type polarizing plate may be located at the back of the collimation optical system.

With this configuration, another polarized component is converted to parallel light by the collimation optical system. Then, parallel light is reflected by the reflection-type polarizing plate, is focused by the collimation optical system, and is efficiently input to the light-emission region of the fluorescent layer. Therefore, it is possible to suppress the spread of the light-emission region due to the reflection-type polarizing plate being further provided.

The projector according to the aspect of the invention may further include a reflection-type polarizing plate directly transmitting one polarized component from among polarized components included in light emitted from the first solid-state light source device, and reflecting another polarized component toward the fluorescent layer. The reflection-type polarizing plate may be disposed at the back of the excitation light reflection optical system.

Meanwhile, if the reflection-type polarizing plate is disposed in front of the excitation light reflection optical system, part of excitation light reflected by the excitation light reflection optical system may be absorbed by the reflection-type polarizing plate, such that it may be difficult to improve light use efficiency.

However, with the above-described configuration, part of excitation light reflected by the excitation light reflection optical system is not absorbed by the reflection-type polarizing plate. Therefore, light use efficiency can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to the invention will be described based on embodiments shown in the drawings.

First Embodiment

First, the configuration of a projector 1000 according to a first embodiment will be described.

Figure 1:
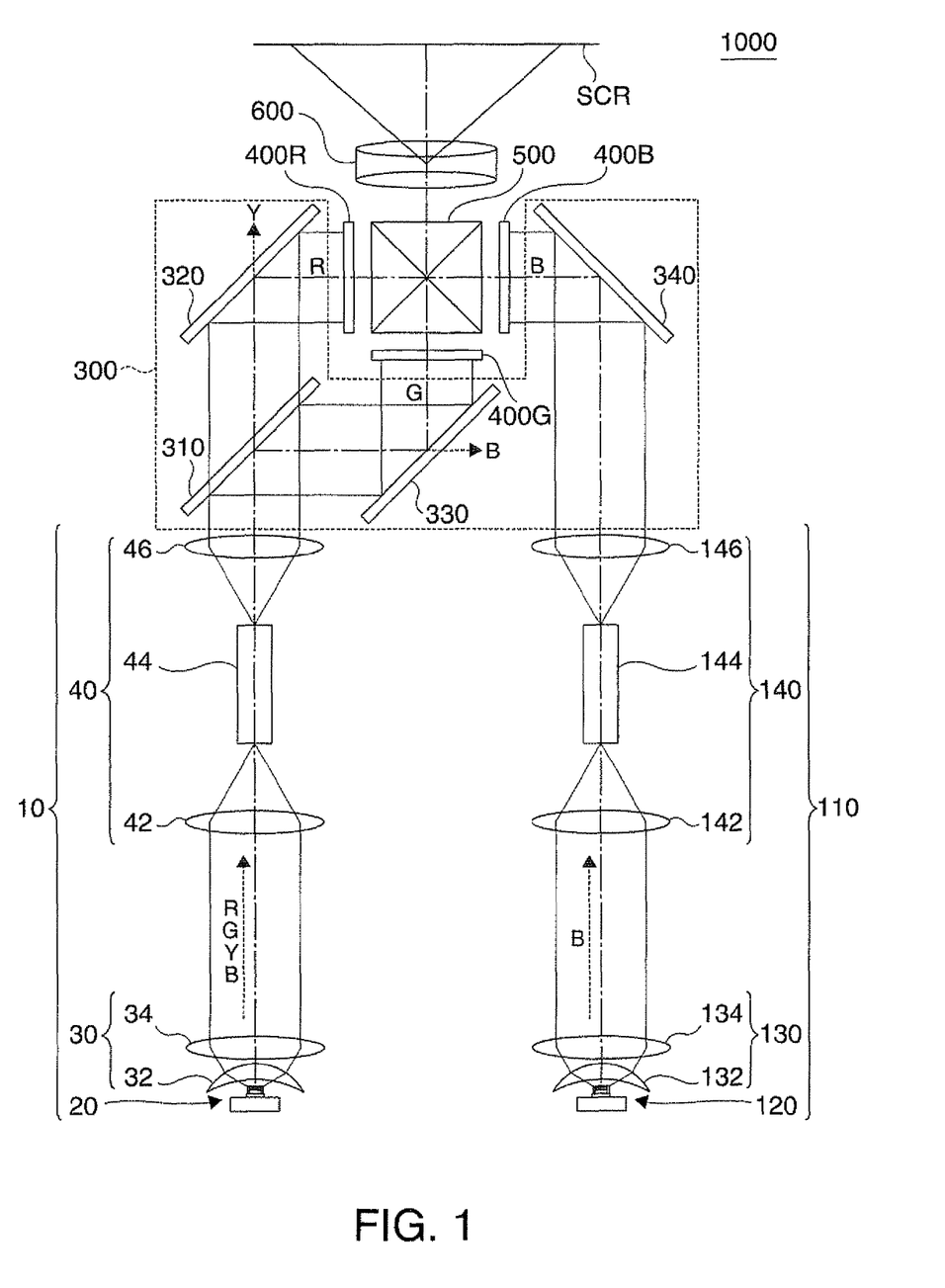
FIG. 1 is a plan view showing optical systems of a projector according to a first embodiment.

FIG. 1 is a plan view showing optical systems of the projector 1000 according to the first embodiment.

Figure 2A:
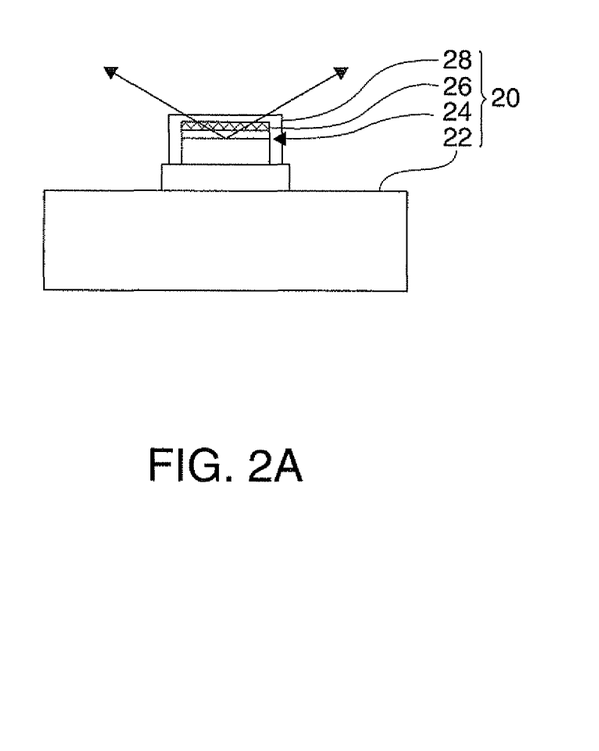
FIGS. 2A and 2B are diagrams illustrating a first solid-state light source device and a second solid-state light source device in the projector according to the first embodiment.
Figure 2B:
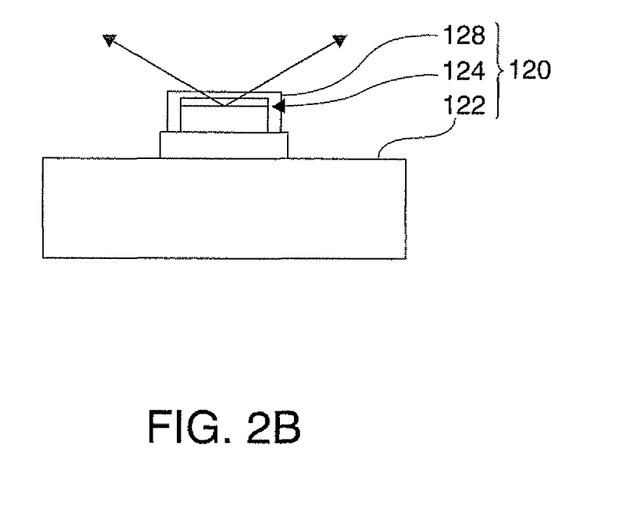

FIGS. 2A and 2B are diagrams illustrating a first solid-state light source device 20 and a second solid-state light source device 120 in the projector 1000 according to the first embodiment. FIG. 2A is a sectional view of the first solid-state light source device 20. FIG. 2B is a sectional view of the second solid-state light source device 120.

Figure 3A:
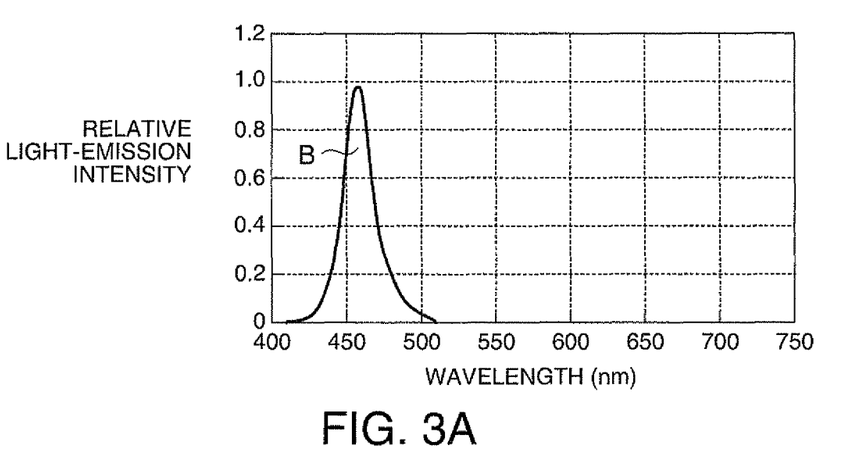
FIGS. 3A to 3C are graphs showing relative light-emission intensity of a first solid-state light source, a fluorescent layer, and a second solid-state light source in the projector according to the first embodiment.
Figure 3B:
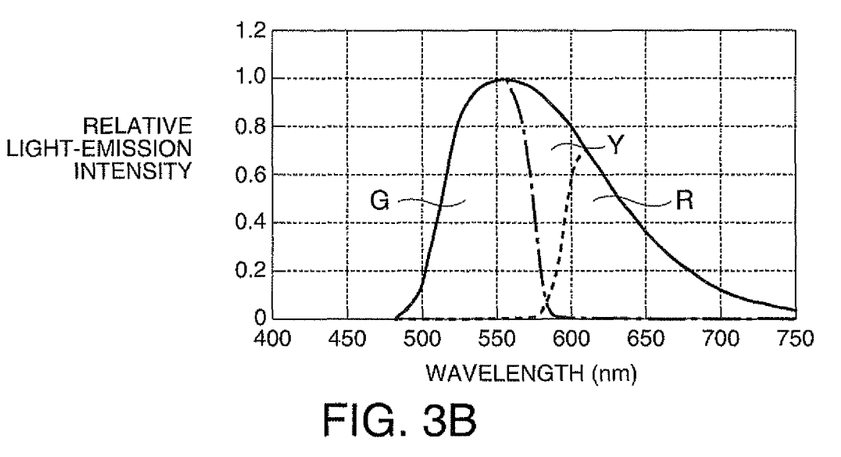
Figure 3C:
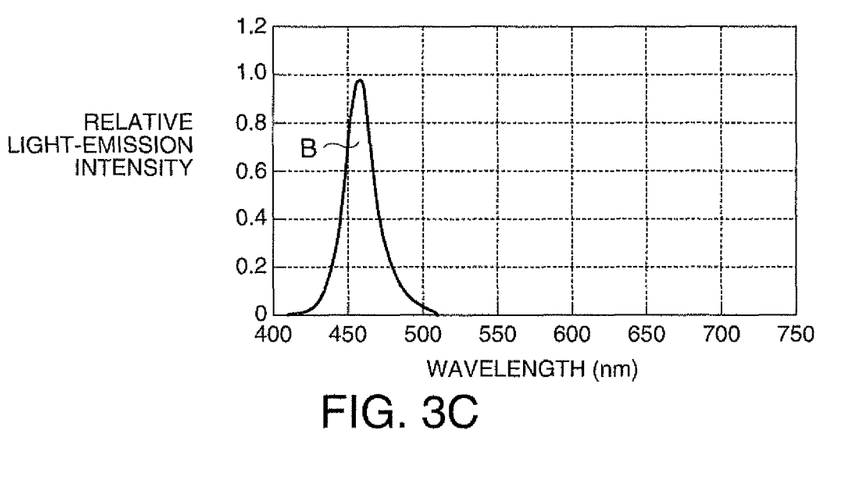

FIGS. 3A to 3C are graphs showing relative light-emission intensity of a first solid-state light source 24, a fluorescent layer 26, and a second solid-state light source 124 in the projector 1000 according to the first embodiment. FIG. 3A is a graph showing relative light-emission intensity of a first solid-state light source 24. FIG. 3B is a graph showing relative light-emission intensity of a fluorescent layer 26. FIG. 3C is a graph showing relative light-emission intensity of a second solid-state light source 124. The term "relative light-emission intensity" refers to the characteristic regarding intensity of light with a certain wavelength at the time of emission when a voltage is applied in the case of a solid-state light source and when excitation light is input in the case of a fluorescent layer. In the graphs, the vertical axis represents relative light-emission intensity. Light-emission intensity with a wavelength having the maximum light-emission intensity is set to 1. In the graphs, the horizontal axis represents a wavelength.

As shown in FIG. 1, the projector 1000 according to the first embodiment includes a first illumination device 10, a second illumination device 110, a color separating and guiding optical system 300, three liquid crystal light modulation devices 400R, 400G, and 400B serving as a light modulation device, a cross dichroic prism 500, and a projection optical system 600.

The first illumination device 10 includes a first solid-state light source device 20, a collimation optical system 30, and a rod integrator optical system 40.

As shown in FIG. 2A, the first solid-state light source device 20 is a light-emitting diode which has a base 22, a first solid-state light source 24, a fluorescent layer 26, and a seal member 28. The first solid-state light source device 20 emits light including a red light component, a yellow light component, and a green light component (see FIG. 3B which will be described below). The first solid-state light source device 20 has lead wires and the like in addition to the above-described constituent elements, but the lead wires and the like will not be shown or described.

The base 22 is a base on which the first solid-state light source 24 is mounted.

The first solid-state light source 24 emits blue light component (the peak of light-emission intensity: about 460 nm, see FIG. 3A) as excitation light. Referring to FIG. 3A, reference numeral B denotes a color light component which is emitted by the first solid-state light source 24 as excitation light (blue light component). The first solid-state light source 24 includes gallium nitride as a main component and has a pn junction-type structure. The first solid-state light source may not have a pn junction-type structure, but may have a double hetero junction-type structure, a quantum well junction-type structure, or the like.

A reflecting layer (not shown) is formed between the first solid-state light source 24 and the base 22. A blue light component emitted from the first solid-state light source toward the base 22 is reflected toward the fluorescent layer 26 by the reflecting layer.

The fluorescent layer 26 is formed of a layer containing a $(Y,Gd)_3(Al,Ga)_5O_{12}$:Ce which is a YAG-based fluorescent material, and is disposed in the illuminated region of the first solid-state light source 24. The fluorescent layer 26 is most efficiently excited by a blue light component with a wavelength of about 460 nm. As shown in FIG. 3B, the fluorescent layer 26 converts a blue light component emitted from the first solid-state light source 24 to light including a red light component (the peak of light-emission intensity: about 610 nm), a yellow light component (the peak of light-emission intensity: about 580 nm), and a green light component (the peak of light-emission intensity: about 550 nm), and emits converted light. Referring to FIG. 3B, reference numeral R denotes a color light component, which can be used as a red light component, from among the light components emitted from the fluorescent layer 26. Reference numeral G denotes a color light component, which can be used as a green light component, from among the light components emitted from the fluorescent layer 26. Reference numeral Y denotes a color light component which is emitted as a yellow light component from the fluorescent layer.

The seal member 28 is formed of transparent epoxy resin, and protects the first solid-state light source 24 and the fluorescent layer 26.

As shown in FIG. 1, the collimation optical system 30 includes a convex meniscus lens 32 which suppresses the spread of light from the first solid-state light source device 20, and a convex lens 34 which parallelizes light from the convex meniscus lens 32. As a whole, the collimation optical system 30 has a function to parallelize light from the first solid-state light source device 20.

The rod integrator optical system 40 includes a convex lens 42, a rod lens 44, and a convex lens 46.

The convex lens 42 focuses parallel light from the collimation optical system 30 and guides focused light to the incidence surface of the rod lens 44.

The rod lens 44 is a solid columnar lens. The rod lens 44 multiply reflects light input from the incidence surface within the plane to make light uniform, and emits light having a uniform in-plane light-emission intensity distribution from the emission surface. As the rod lens, a hollow columnar lens, instead of a solid columnar lens, may be used.

The convex lens 46 substantially parallelizes light emitted from the emission surface of the rod lens 44, and guides relevant light to the image forming regions of the liquid crystal light modulation devices 400R and 400G.

The second illumination device 110 includes a second solid-state light source device 120, a collimation optical system 130, and a rod integrator optical system 140.

As shown in FIG. 2B, the second solid-state light source device 120 is a light-emitting diode which has a base 122, a second solid-state light source 124, and a seal member 128, and emits a blue light component (see FIG. 3C which will be described below). The second solid-state light source device 120 has lead wires and the like in addition to the above-described constituent elements, but the lead wires and the like will not be shown or described.

As shown in FIG. 3C, the second solid-state light source 124 emits a blue light component (the peak of light-emission intensity: about 460 nm) as a color light component. Referring to FIG. 3C, reference numeral B denotes a color light component which is emitted as a color light component (blue light component) from the second solid-state light source 124.

The base 122, the second solid-state light source 124, and the seal member 128 respectively have the same configuration as the base 22, the first solid-state light source 24, and the seal member 28, thus detailed description thereof will not be repeated.

The first solid-state light source 24 and the second solid-state light source 124 are formed of the same material by the same manufacturing method, and have the same structure. For this reason, the first solid-state light source 24 and the second solid-state light source 124 have the same temperature characteristic, such that change in the light amount with change in temperature is identical.

As shown in FIG. 1, the collimation optical system 130 includes a convex meniscus lens 132 which suppresses the spread of light from the second solid-state light source device 120, and a convex lens 134 which parallelizes light from the convex meniscus lens 132. As a whole, the collimation optical system 130 has a function to parallelize light from the second solid-state light source device 120.

The rod integrator optical system 140 includes a convex lens 142, a rod lens 144, and a convex lens 146.

The convex lens 142 focuses parallel light from the collimation optical system 130, and guides focused light to the incidence surface of the rod lens 144.

The rod lens 144 is a solid columnar lens. The rod lens 144 multiply reflects light input from the incidence surface within the plane to make light uniform, and emits light having a uniform in-plane light-emission intensity distribution from the emission surface. As the rod lens, a hollow columnar lens, instead of a solid columnar lens, may be used.

The convex lens 146 substantially parallelizes light emitted from the emission surface of the rod lens 144, and guides relevant light to the image forming region of the liquid crystal light modulation device 400B.

The color separating and guiding optical system 300 includes a dichroic mirror 310 which is disposed upstream of the optical path, and dichroic mirrors 320 and 330 and a reflecting mirror 340 for a blue light component which are disposed downstream of the optical path. The color separating and guiding optical system 300 has a function to separate light from the first illumination device 10 into a red light component and a green light component, and to guide the color light components, the red light component and the green light component, to the liquid crystal light modulation devices 400R and 400G to be illuminated, and a function to guide the blue light component from the second illumination device 110 to the liquid crystal light modulation device 400B to be illuminated.

The dichroic mirrors 310, 320, and 330 are mirrors which have a wavelength selective transmission film formed on the substrate to reflect light having a predetermined wavelength region and to transmit light having another wavelength region.

The dichroic mirror 310 is a dichroic mirror which reflects the green light component and the blue light component, and transmits the red light component and the yellow light component.

The dichroic mirror 320 is a dichroic mirror which reflects the red light component and transmits the yellow light component. The yellow light component having transmitted the dichroic mirror 320 is removed outside the system. That is, the projector 1000 has a function to remove the yellow light component by the dichroic mirror 320. In FIG. 1, a dotted-line arrow (see reference numeral Y) extending from the dichroic mirror 320 represents the yellow light component having transmitted the dichroic mirror 320.

The dichroic mirror 330 is a dichroic mirror which reflects the green light component and transmits the blue light component. The blue light component having transmitted the dichroic mirror 330 is removed outside the system. That is, the projector 1000 has a function to remove excitation light (blue light component) by the dichroic mirror 330. In FIG. 1, a dotted-line arrow (see reference numeral B) extending from the dichroic mirror 330 represents the blue light component having transmitted the dichroic mirror 330.

The red light component having transmitted the dichroic mirror 310 is reflected by the dichroic mirror 320 and input to the image forming region of the liquid crystal light modulation device 400R for a red light component.

The green light component having been reflected by the dichroic mirror 310 is further reflected by the dichroic mirror 330 and input to the image forming region of the liquid crystal light modulation device 400G for a green light component.

The blue light component from the second illumination device 110 is reflected by the reflecting mirror 340 and input to the image forming region of the liquid crystal light modulation device 400B for a blue light component.

The liquid crystal light modulation devices 400R, 400G, and 400B modulate the input color light components in accordance with image information to form a color image, and are illuminated by the first illumination device 10 and the second illumination device 110. Though not shown, incidence-side polarizing plates are respectively disposed between the dichroic mirror 320 and the liquid crystal light modulation device 400R, between the dichroic mirror 330 and the liquid crystal light modulation device 400G, and between the reflecting mirror 340 and the liquid crystal light modulation device 400B. Emission-side polarizing plates are respectively disposed between the liquid crystal light modulation devices 400R, 400G, and 400B and the cross dichroic prism 500. Light modulation of the respective input color light components is carried out by the incidence-side polarizing plates, the liquid crystal light modulation devices 400R, 400G, and 400B, and the emission-side polarizing plates.

The liquid crystal light modulation devices 400R, 400G, and 400B are transmission-type liquid crystal light modulation devices in which liquid crystal serving as an electro-optical material is sealed between a pair of transparent glass substrates. For example, each of the liquid crystal light modulation devices 400R, 400G, and 400B modulates the polarization direction of one linearly polarized light emitted from the corresponding incidence-side polarizing plate in accordance with a given image signal with a polysilicon TFT as a switching element.

The cross dichroic prism 500 is an optical element which combines modulated optical images for the respective color light components emitted from the emission-side polarizing plates to form a color image. The cross dichroic prism 500 is formed by bonding four rectangular prisms to each other and substantially has a square shape in plan view. A dielectric multilayer film is formed at an interface having a substantially X shape of the bonded rectangular prisms. A dielectric multilayer film formed at one interface having a substantially X shape reflects the red light component, and a dielectric multilayer film formed at another interface reflects the blue light component. These dielectric multilayer films cause the red light component and the blue light component to be bent and arranged in the traveling direction of the green light component, such that the three color light components are combined.

The color image emitted from the cross dichroic prism 500 is enlarged and projected by the projection optical system 600 to form an image on a screen SCR.

Next, the effects of the projector 1000 according to the first embodiment will be described.

According to the projector 1000 of the first embodiment, the two color light components (red light component and green light component) emitted from the first solid-state light source device 20 and one color light component (blue light component) emitted from the second solid-state light source device 120 are used as the three color light components (red light component, green light component, and blue light component) which are modulated by the liquid crystal light modulation devices 400R, 400G, and 400B. Therefore, the thermal load imposed on the respective solid-state light source devices can be reduced compared to a projector which includes a single solid-state light source device. As a result, the projection image can be brightened compared to a projection which includes a single solid-state light source device.

According to the projector 1000 of the first embodiment, the two color light components (red light component and green light component) from among the three color light components (red light component, green light component, and blue light component) which are modulated by the liquid crystal light modulation devices 400R, 400G, and 400B are generated by using the same solid-state light source (first solid-state light source 24). Therefore, the color balance of the projection image can be stabilized compared to a projector which includes three solid-state light source devices.

As a result, the projector 1000 of the first embodiment can brighten the projection image compared to a projector which includes a single solid-state light source device, and can stabilize the color balance of the projection image compared to a projector which includes three solid-state light source devices.

According to the projector 1000 of the first embodiment, excitation light is a blue light component, the first color light component is a red light component, the second color light component is a green light component, and the third color light is a blue light component. Therefore, light including the red light component and the green light component can be emitted from the first solid-state light source device 20 by using the first solid-state light source 24 which emits the blue light component.

According to the projector 1000 of the first embodiment, the green light component is generated by using the first solid-state light source 24 (emitting the blue light component) which has high light-emission efficiency compared to the solid-state light source which is used in the solid-state light source device emitting the green light component. Therefore, light-emission efficiency can be increased compared to a case where the solid-state light source device emitting the green light component is used.

According to the projector 1000 of the first embodiment, the first solid-state light source 24 and the second solid-state light source 124 have the same temperature characteristic. Therefore, with regard to all of the color light components, changes in the light amount with change in temperature are made the same, such that the color balance of the projection image can be further stabilized.

According to the projector 1000 of the first embodiment, the fluorescent layer 26 is formed of a layer containing (Y,Gd)$_3$(Al,Ga)$_5$O$_{12}$:Ce which is a YAG-based fluorescent material. Therefore, the projection image can be further brightened, and a high-reliable projector can be obtained.

According to the projector 1000 of the first embodiment, the dichroic mirror 320 has a function to remove the yellow light component from light from the first solid-state light source device 20. Therefore, the yellow light component can be removed from light from the first solid-state light source device 20. As a result, color reproducibility can be prevented from being deteriorated due to the yellow light component.

According to the projector 1000 of the first embodiment, the dichroic mirror 330 has a function to remove excitation light (blue light component) from light from the first solid-state light source device 20. Therefore, the excitation light (blue light component) can be removed from light from the first solid-state light source device 20. As a result, color reproducibility or the light modulation device can be prevented from being deteriorated due to excitation light (blue light component).

Second Embodiment

Figure 4:
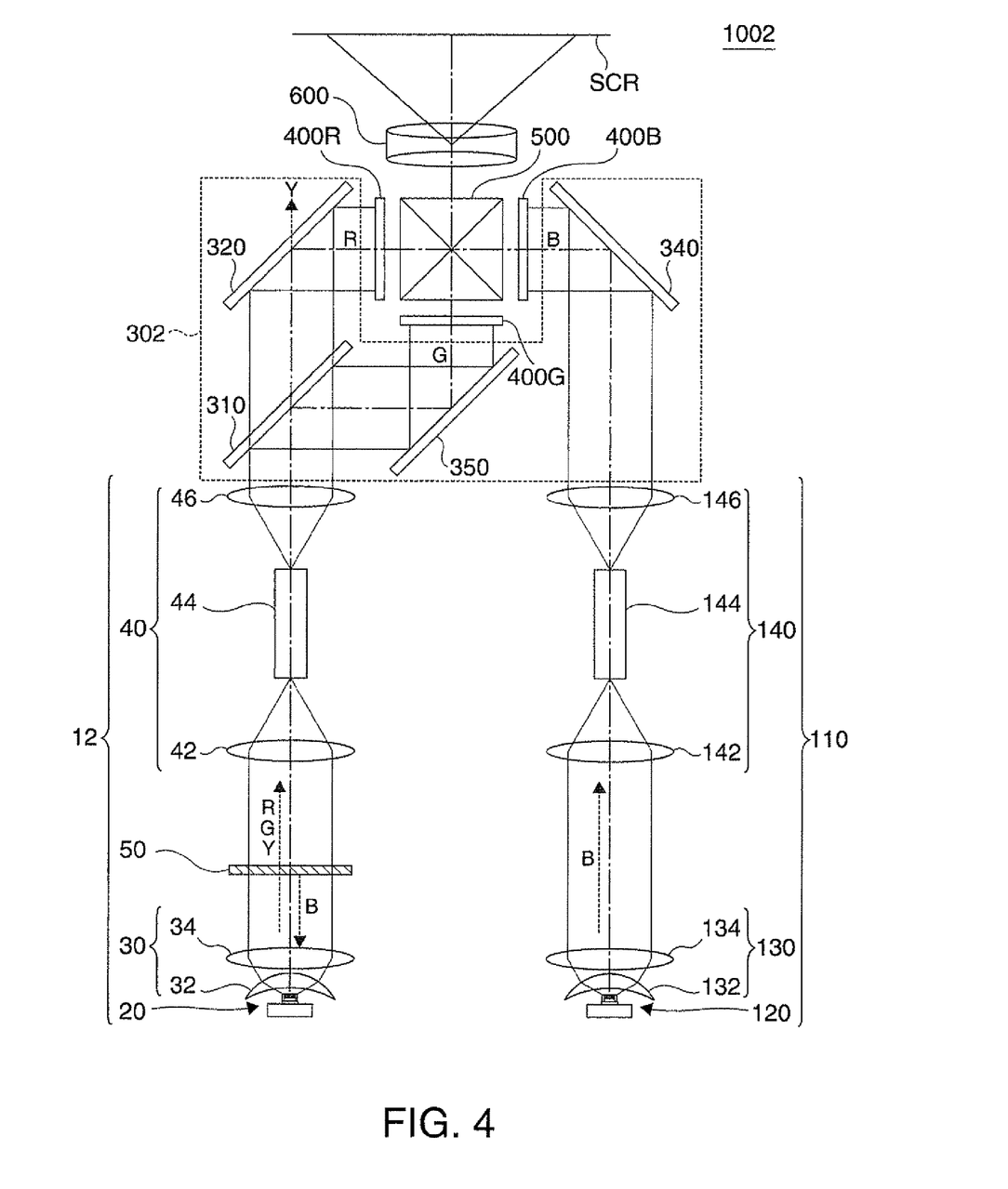
FIG. 4 is a plan view showing optical systems of a projector according to a second embodiment.

FIG. 4 is a plan view showing optical systems of a projector 1002 according to a second embodiment.

The projector 1002 of the second embodiment basically has the same configuration as the projector 1000 of the first embodiment, but a first illumination device and a color separating and guiding optical system have the configuration different from those in the projector 1000 of the first embodiment.

That is, in the projector 1002 of the second embodiment, as shown in FIG. 4, a first illumination device 12 further includes an excitation light reflecting mirror 50, serving as an excitation light reflection optical system, which is located at the back of the collimation optical system 30, separates light emitted from the fluorescent layer 26 (red light component, green light component, and yellow light component) from excitation light (blue light component) emitted while being not converted by the fluorescent layer 26, and returns excitation light (blue light component), which is emitted while being not converted, toward the fluorescent layer 26. The excitation light reflecting mirror 50 is a dichroic mirror which has a wavelength selective transmission film formed on the substrate to reflect the blue light component and transmits the red light component, the green light component, and the yellow light component. In FIG. 4, a dotted-line arrow (see reference numeral B) extending from the excitation light reflecting mirror 50 represents the blue light component reflected by the excitation light reflecting mirror 50.

Thus, since no excitation light (blue light component) is input to a color separating and guiding optical system 302, the dichroic mirror 330 having a function to remove excitation light (blue light component) is not required. For this reason, the color separating and guiding optical system 302 includes a reflecting mirror 350, instead of the dichroic mirror 330.

As described above, in the projector 1002 of the second embodiment, the first illumination device and the color separating and guiding optical system have the configuration different from those in the projector 1000 of the first embodiment; however, the two color light components (red light component and green light component) emitted from the first solid-state light source device 20 and one color light component (blue light component) emitted from the second solid-state light source device are used as the three color light components (red light component, green light component, and blue light component) which are modulated by the liquid crystal light modulation devices 400R, 400G, and 400B, and the two color light components (red light component and green light component) from among the three color light components (red light component, green light component, and blue light component) which are modulated by the liquid crystal light modulation devices 400R, 400G, and 400B are generated by using the same solid-state light source (first solid-state light source 24). Therefore, similarly to the projector 1000 of the first embodiment, the projection image can be brightened compared to a projector which includes a single solid-state light source device, and the color balance of the projection image can be stabilized compared to a projector which includes three solid-state light source devices.

According to the projector 1002 of the second embodiment, since the excitation light reflecting mirror 50 is further provided, excitation light (blue light component) having transmitted the fluorescent layer 26 while being not converted is input again to the fluorescent layer 26. Thus, excitation light (blue light component) is reused such that light use efficiency can be improved, and consequently, the projection image can be further brightened. Further, excitation light (blue light component) can be removed from light from the first solid-state light source device 20. As a result, color reproducibility or the light modulation device can be prevented from being deteriorated due to excitation light (blue light component).

According to the projector 1002 of the second embodiment, the excitation light reflecting mirror 50 is located at the back of the collimation optical system 30. Thus, excitation light (blue light component) which directly transmits the fluorescent layer 26 and is converted to parallel light by the collimation optical system 30 is reflected as parallel light by the excitation light reflecting mirror 50, is focused by the collimation optical system 30, and is efficiently input to the light-emission region of the fluorescent layer 26. Therefore, it is possible to suppress the spread of the light-emission region due to the excitation light reflecting mirror 50 being further provided.

The projector 1002 of the second embodiment has the same configuration as the projector 1000 of the first embodiment, excluding the configuration of the first illumination device and the color separating and guiding optical system. Therefore, the projector 1002 of the second embodiment also has the relevant effects from among the effects of the projector 1000 of the first embodiment.

Third Embodiment

Figure 5:
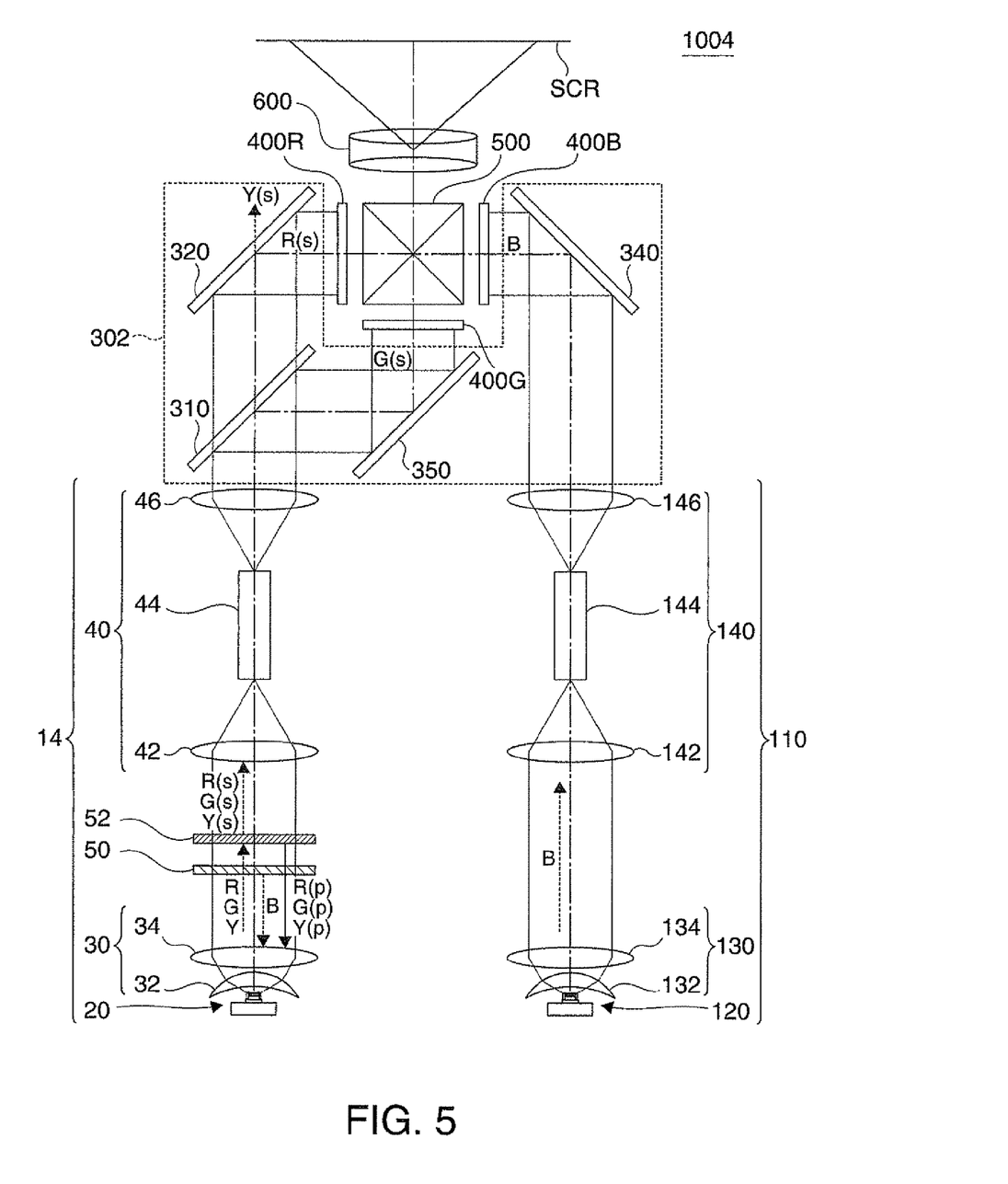
FIG. 5 is a plan view showing optical systems of a projector according to a third embodiment.

FIG. 5 is a plan view showing optical systems of a projector 1004 according to a third embodiment.

The projector 1004 of the third embodiment basically has the same configuration as the projector 1002 of the second embodiment, but the configuration of the first illumination device is different from that in the projector 1002 of the second embodiment.

That is, in the projector 1004 of the third embodiment, as shown in FIG. 5, the first illumination device 14 further includes a reflection-type polarizing plate 52 which is located at the back of the collimation optical system 30, directly transmits one polarized component (for example, s polarized component) from among polarized components included in light emitted from the first solid-state light source device 20, and reflects another polarized component (for example, p polarized component) toward the fluorescent layer 26. The reflection-type polarizing plate 52 is a wire grid polarizing plate which has fine metal wires disposed in a lattice shape at specific pitches. As the reflection-type polarizing plate, a polarization beam splitter (PBS) having a dielectric multi-layer film on a substrate may be used, instead of the wire grid polarizing plate. In FIG. 5, a solid-line arrow (see reference numeral R(p),G(p),Y(p)) extending from the reflection-type polarizing plate 52 represents another polarized component reflected by the reflection-type polarizing plate 52.

As described above, in the projector 1004 of the third embodiment, the first illumination device has the configuration different from that in the projector 1002 of the second embodiment; however, the two color light components (red light component and green light component) emitted from the first solid-state light source device 20 and one color light component (blue light component) emitted from the second solid-state light source device (blue light component) are used as the three color light components (red light component, green light component, and blue light component) which are modulated by the liquid crystal light modulation devices 400R, 400G, and 400B, and the two color light components (red light component and green light component) from among the three color light components (red light component, green light component, and blue light component) which are modulated by the liquid crystal light modulation devices 400R, 400G, and 400B are generated by using the same solid-state light source (first solid-state light source 24). Thus, similarly to the projector 1002 of the second embodiment, the projection image can be brightened compared to a projector which includes a single solid-state light source device, and the color balance of the projection image can be stabilized compared to a projector which includes three solid-state light source devices.

According to the projector 1004 of the third embodiment, the reflection-type polarizing plate 52 is further provided. Thus, another polarized component is returned again to the fluorescent layer 26 and reflected by the surface of the fluorescent layer 26, and part of another polarized component is converted to one polarized component and reused, such that light use efficiency can be improved, and consequently the projection image can be further brightened.

According to the projector 1004 of the third embodiment, the reflection-type polarizing plate 52 is located at the back of the collimation optical system 30. Thus, another polarized component which is converted to parallel light by the collimation optical system 30 is reflected as parallel light by the reflection-type polarizing plate 52, is focused by the collimation optical system 30, and is efficiently input to the light-emission region of the fluorescent layer 26. Therefore, it is possible to suppress the spread of the light-emission region due to the reflection-type polarizing plate 52 being further provided.

According to the projector 1004 of the third embodiment, the reflection-type polarizing plate 52 is disposed at the back of the excitation light reflecting mirror 50. Therefore, part of excitation light reflected by the excitation light reflecting mirror 50 is not absorbed by the reflection-type polarizing plate 52, such that light use efficiency can be improved.

The projector 1004 of the third embodiment has the same configuration as the projector 1002 of the second embodiment, excluding the configuration of the first illumination device. Therefore, the projector 1004 of the third embodiment also has the relevant effects from among the effects of the projector 1002 of the second embodiment.

Fourth Embodiment

Figure 6:
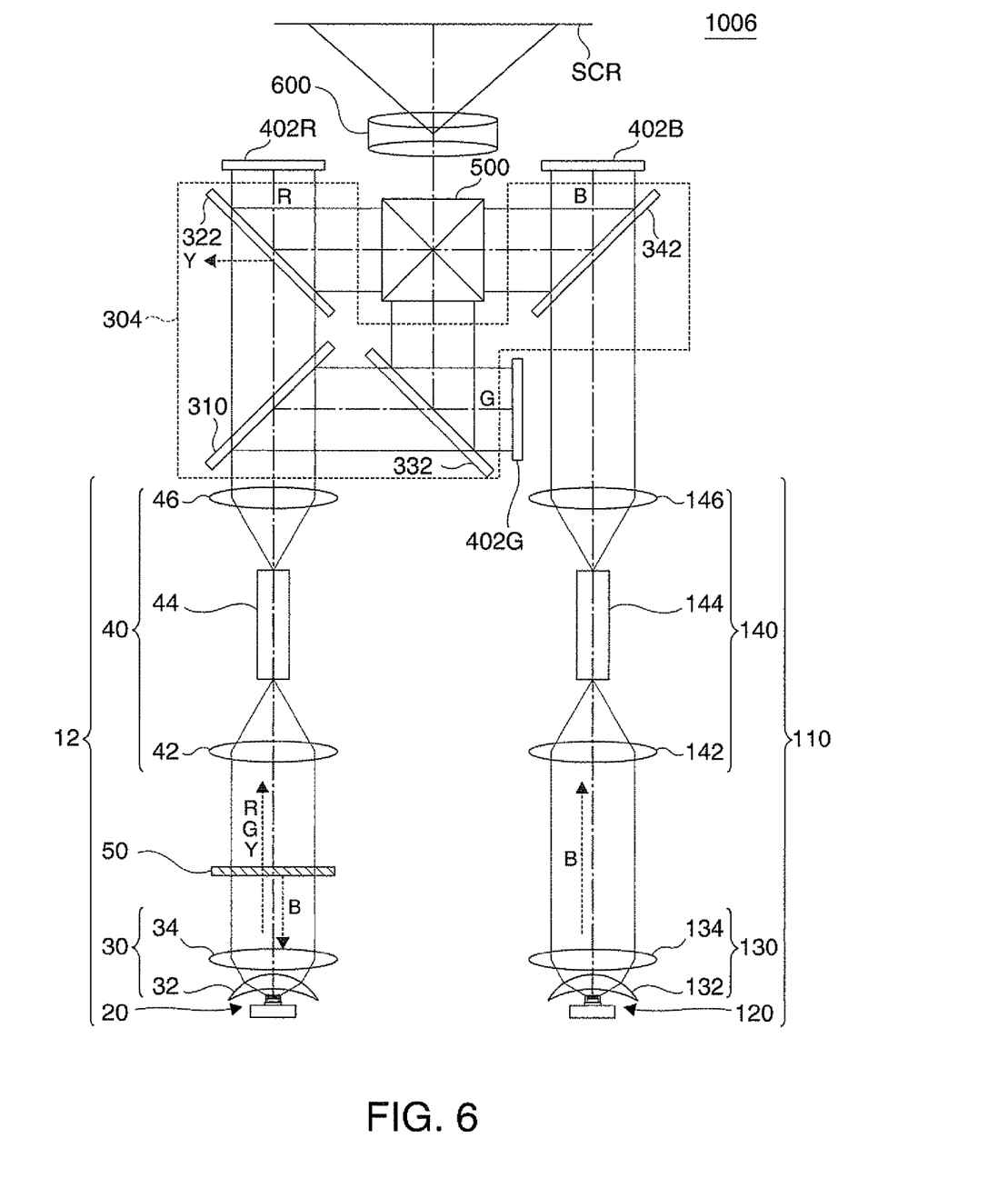
FIG. 6 is a plan view showing optical systems of a projector according to a fourth embodiment.

FIG. 6 is a plan view showing optical systems of a projector 1006 according to a fourth embodiment.

The projector 1006 of the fourth embodiment basically has the same configuration as the projector 1002 of the second embodiment, but a light modulation device and a color separating and guiding optical system have the configuration different from those in the projector 1002 of the second embodiment.

That is, in the projector 1006 of the fourth embodiment, as shown in FIG. 6, a light modulation device has reflection-type liquid crystal light modulation devices 402R, 402G, and 402B. A color separating and guiding optical system is a color separating and guiding optical system 304. The color separating and guiding optical system 304 has a dichroic mirror 310 which reflects a green light component and transmits other color light components, and reflection-type polarizing plates 322, 332, and 342 which directly transmit one polarized component (for example, s polarized component) and reflect another polarized component (p polarized component). The reflection-type polarizing plate 322 also functions as a dichroic mirror which reflects a yellow light component and transmits a red light component. The reflection-type polarizing plate 322 is, for example, an optical element which has fine metal wires serving as a wire grid polarizing plate disposed on one surface of the substrate in a lattice shape at specific pitches and has a wavelength selective transmission film serving as a dichroic mirror on the other surface of the substrate. That is, the projector 1006 has a function to remove a yellow light component by the reflection-type polarizing plate 322.

The liquid crystal light modulation devices 402R, 402G, and 402B carry out light modulation of the respective input color light components, together with the reflection-type polarizing plates 322, 332, and 342 in the color separating and guiding optical system 304. The color separating and guiding optical system 304 has a function to separate light from the first illumination device 10 into a red light component and a green light component, to guide the respective color light components, the red light component and the green light component, to the liquid crystal light modulation devices 402R and 402G to be illuminated, and to guide the light components reflected by the liquid crystal light modulation devices 402R and 402G to the cross dichroic prism 500 as modulated light components, and a function to guide the blue light component from the second illumination device 110 to the liquid crystal light modulation device 402B to be illuminated and to guide the light component reflected by the liquid crystal light modulation device to the cross dichroic prism 500 as modulated light component.

As described above, in the projector 1006 of the fourth embodiment, the light modulation device and the color separating and guiding optical system have the configuration different from those in the projector 1002 of the second embodiment; however, the two color light components (red light component and green light component) emitted from the first solid-state light source device 20 and one color light component (blue light component) emitted from the second solid-state light source device are used as the three color light components (red light component, green light component, and blue light component) which are modulated by the liquid crystal light modulation devices 402R, 402G, and 402B, and the two color light components (red light component and green light component) from among the three color light components (red light component, green light component, and blue light component) which are modulated by the liquid crystal light modulation devices 402R, 402G, and 402B are generated by using the same solid-state light source (first solid-state light source 24). Therefore, similarly to the projector 1002 of the second embodiment, the projection image can be brightened compared to a projector which includes a single solid-state light source device, and the color balance of the projection image can be stabilized compared to a projector which includes three solid-state light source devices.

The projector 1006 of the fourth embodiment has the same configuration as the projector 1002 of the second embodiment, excluding the configuration of the light modulation device and the color separating and guiding optical system. Therefore, the projector 1006 of the fourth embodiment also has the same effects as the effects of the projector 1002 of the second embodiment.

Fifth Embodiment

Figure 7:
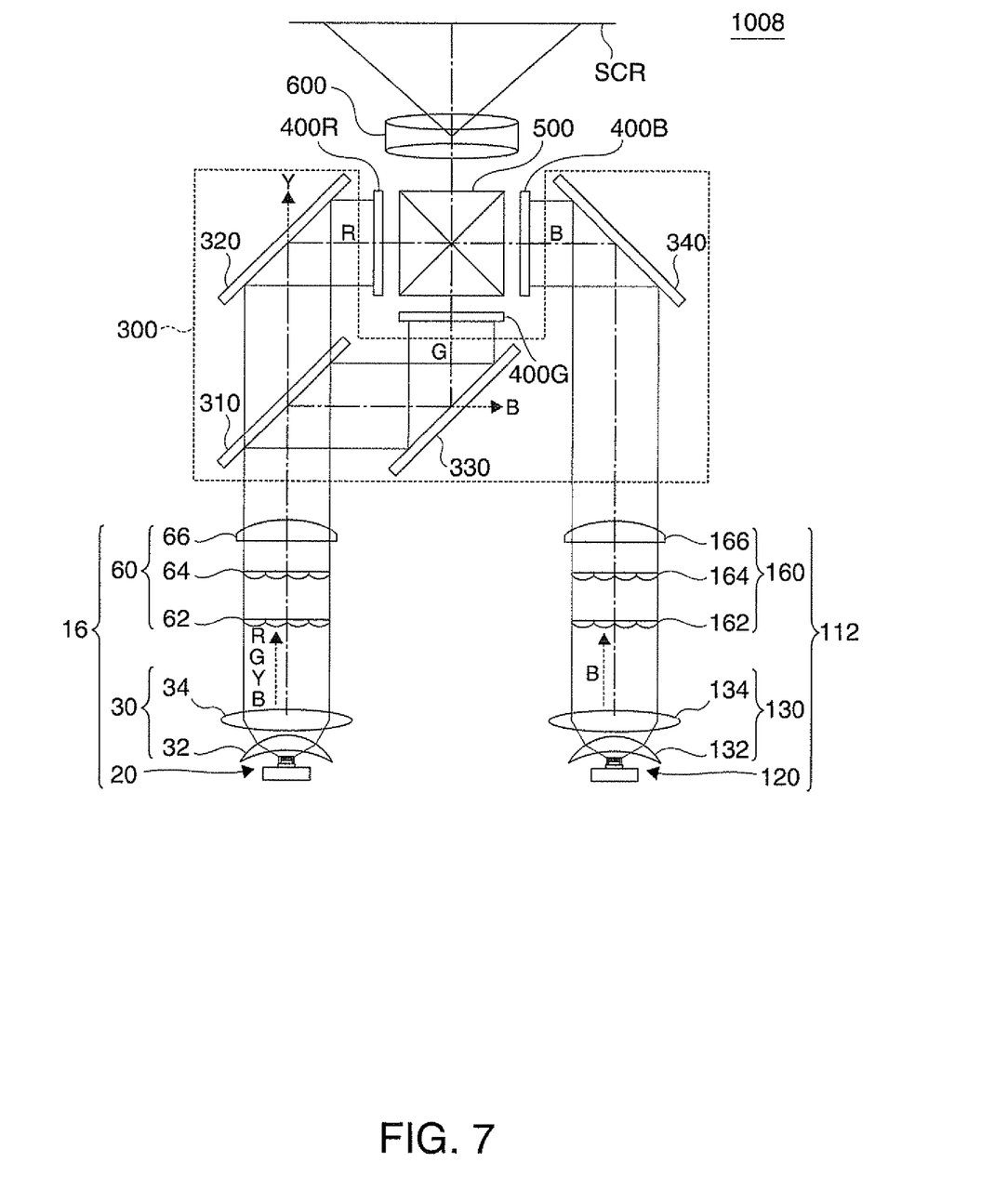
FIG. 7 is a plan view showing optical systems of a projector according to a fifth embodiment.

FIG. 7 is a plan view showing optical systems of a projector 1008 according to a fifth embodiment.

The projector 1008 of the fifth embodiment basically has the same configuration as the projector 1000 of the first embodiment, but a first illumination device and a second illumination device have the configuration different from those in the projector 1000 of the first embodiment.

That is, in the projector 1008 of the fifth embodiment, as shown in FIG. 7, a first illumination device 16 includes a lens integrator optical system 60, instead of the rod integrator optical system 40, and a second illumination device 112 includes a lens integrator optical system 160, instead of the rod integrator optical system 140. The lens integrator optical system 60 includes a first lens array 62, a second lens array 64, and a superimposing lens 66. The lens integrator optical system 160 includes a first lens array 162, a second lens array 164, and a superimposing lens 166.

As described above, in the projector 1008 of the fifth embodiment, the first illumination device and the second illumination device have the configuration different from those in the projector 1000 of the first embodiment; however, the two color light components (red light component and green light component) emitted from the first solid-state light source device 20 and one color light component (blue light component) emitted from the second solid-state light source device are used as the three color light components (red light component, green light component, and blue light component) which are modulated by the liquid crystal light modulation devices 400R, 400G, and 400B, and the two color light components (red light component and green light component) from among the three color light components (red light component, green light component, and blue light component) which are modulated by the liquid crystal light modulation devices 400R, 400G, and 400B are generated by using the same solid-state light source (first solid-state light source 24). Therefore, similarly to the projector 1000 of the first embodiment, the projection image can be brightened compared to a projector which includes a single solid-state light source device, and the color balance of the projection image can be stabilized compared to a projector which includes three solid-state light source devices.

The projector 1008 of the fifth embodiment has the same configuration as the projector 1000 of the first embodiment, excluding the configuration of the first illumination device and the second illumination device. Therefore, the projector 1008 of the fifth embodiment also has the same effects as the effects of the projector 1000 of the first embodiment.

Although the invention has been described on the basis of the foregoing embodiments, the invention is not limited to the foregoing embodiments. The invention may be carried out in various forms without departing from the scope and spirit of the invention. For example, the following modification may be made.

(1) Although in the foregoing embodiments, the fluorescent layer 26 is formed of a layer containing $(Y,Gd)_3(Al,Ga)_5O_{12}$:Ce, the invention is not limited thereto. For example, the fluorescent layer may be formed of a layer containing a YAG-based fluorescent material other than $(Y,Gd)_3(Al,Ga)_5O_{12}$:Ce, a layer containing a silicate-based fluorescent material, or a layer containing a TAG-based fluorescent material. Further, the fluorescent layer may be formed of a layer containing a mixture of a fluorescent material which converts excitation light to a red light component and a fluorescent material which converts excitation light to a green light component.

(2) Although in the foregoing embodiments, a liquid crystal light modulation device is used as a light modulation device for a projector, the invention is not limited thereto. As a light modulation device, in general, any device may be used insofar as the device modulates incident light in accordance with image information. For example, a micromirror-type light modulation device or the like may be used. As a micromirror-type light modulation device, for example, DMD (Digital Micromirror Device) (Trademark of TI Inc.) may be used.

(3) Although in the foregoing embodiments, the first solid-state light source device 20 and the second solid-state light source device 120 are light-emitting diodes, the invention is not limited thereto. The first solid-state light source device and the second solid-state light source device may be, for example, semiconductor laser or organic light-emitting diodes.

(4) Although in the foregoing embodiments, excitation light is a blue light component, the invention is not limited thereto. Excitation light may be ultraviolet light. With this configuration, light including a red light component and a green light component can be emitted from the first illumination device, and light-emission efficiency can be increased compared to a case where a solid-state light source device emitting a green light component is used. Further, the selection width of a fluorescent material in the fluorescent layer is widened.

(5) In the foregoing embodiments, when excitation light is ultraviolet light, the first color light component may be a green light component, the second color light component may be a blue light component, and the third color light component may be a red light component. Further, the first color light component may be a red light component, the second color light component may be a blue light component, and the third color light component may be a green light component.

(6) Although in the first to third, and fifth embodiments, the projector has a function to remove a yellow light component from the first solid-state light source device 20, the invention is not limited thereto. For example, the projector may not have function to remove a yellow light component. In this case, the yellow light component included in light emitted from the first illumination device can be positively used, such that a brighter projection image can be projected. Further, when the yellow light component is not removed, the yellow light component is modulated by using a light modulation device different from that for a red light component or a green light component, such that a projection image having more excellent color reproducibility can be projected, in addition to the above-described effects.

(7) Although in the third embodiment, the first illumination device 14 includes the excitation light reflecting mirror 50 and the reflection-type polarizing plate 52, the invention is not limited thereto. For example, no excitation light reflecting mirror may be provided.

(8) In the foregoing embodiments, the projector may further a polarization conversion device. The polarization conversion device is a polarization conversion element which converts light including one polarized component and another polarized component to substantially one linearly polarized light with a polarization direction arranged.

(9) Although in the foregoing embodiments, the collimation optical systems 30 and 130 respectively include two lenses of the convex meniscus lenses 32 and 132 and the convex lenses 34 and 134, the invention is not limited thereto. For example, the collimation optical system may include only one lens or may include three or more lenses.

(10) The shape of each of the lenses which are used in the optical path of the projector in each of the foregoing embodiments is not limited to those described in the foregoing embodiments. If necessary, lenses having various shapes may be used.

(11) Although in the foregoing embodiments, an example where a projector uses three liquid crystal light modulation devices has been described, the invention is not limited to this example. The invention may be applied to a projector which uses one, two, or four or more liquid crystal light modulation devices.

(12) The invention may be applied to a front projection-type projector which projects a projection image from an observation side, or a rear projection-type projector which projects a projection image from an opposite side to the observation side.

Figure 8:
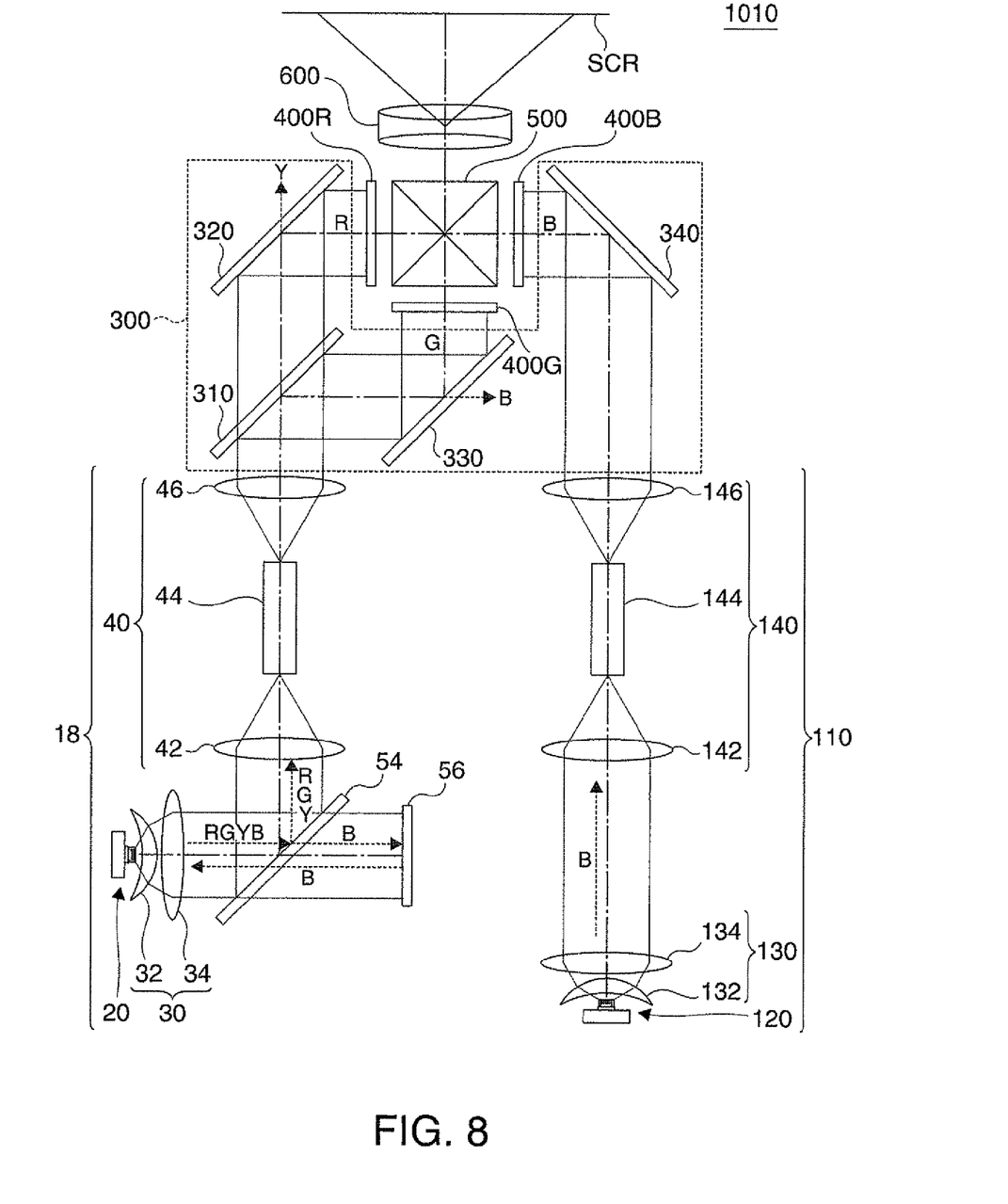
FIG. 8 is a plan view showing optical systems of a projector according to a modification.

(13) Although in the second and third embodiments, the excitation light reflecting mirror 50 is used as the excitation light reflection optical system, the invention is not limited thereto. FIG. 8 is a plan view showing optical systems of a projector 1010 according to a modification. As shown in FIG. 8, as an excitation light reflection optical system, an excitation light reflection optical system may be used which has a dichroic mirror 54 separating light (red light component, green light component, and yellow light component) emitted from the fluorescent layer 26 from excitation light (blue light component) emitted while being not converted by the fluorescent layer, and a reflecting mirror 56 reflecting excitation light (blue light component) from the dichroic mirror 54 toward the fluorescent layer 26. With this configuration, similarly to the second and third embodiments, the projection image can be further brightened, and color reproducibility or the light modulation device can be prevented from being deteriorated due to excitation light.

The entire disclosure of Japanese Patent Application No: 2009-190760, filed Aug. 20, 2009 is expressly incorporated by reference herein.

What is claimed is:

1. A projector comprising:
a first solid-state light source device which includes a first solid-state light source emitting excitation light, and a fluorescent layer converting excitation light emitted from the first solid-state light source to light simultaneously including both a first color light component and a second color light component different from the first color light component, and emitting converted light;
a second solid-state light source device which includes a second solid-state light source emitting a third color light component different from the first color light component and the second color light component;
a light modulation device modulating the first color light component, the second color light component, and the third color light component in accordance with image information; and
a projection optical system projecting the modulated light components from the light modulation device as a projection image.

2. The projector according to claim 1,
wherein excitation light is a blue light component,
the first color light component is a red light component,
the second color light component is a green light component, and
the third color light component is a blue light component.

3. The projector according to claim 2,
wherein the first solid-state light source and the second solid-state light source have the same temperature characteristic.

4. The projector according to claim 2,
wherein the fluorescent layer is formed of a layer containing a YAG-based fluorescent material, a silicate-based fluorescent material, or a TAG-based fluorescent material.

5. The projector according to claim 1,
wherein excitation light is ultraviolet light,
the first color light component is a red light component,
the second color light component is a green light component, and
the third color light component is a blue light component.

6. The projector according to claim 1, further comprising:
a color separating and guiding optical system which includes a first dichroic mirror and a second dichroic mirror, wherein
the light emitted from the fluorescent layer is incident on the color separating and guiding optical system,
the first dichroic mirror separates the light from the fluorescent layer into a first light, including the first color light component and yellow light, and a second light, including the second color light component and the excitation light,
the second dichroic mirror separates the first light into the first color light component and yellow light, and
the first color light component being red light and the second color light component being green light.

7. The projector according to claim 6, wherein
the color separating and guiding optical system guides the first color light component and the second color light component to the light modulation device, guides the third color light component from the second solid-state light source device to the light modulation device and removes the yellow light.

8. The projector according to claim 7,
wherein the color separating and guiding optical system reflects the first color light component or the second color light component from the first solid-state light source device, and transmits the yellow light.

9. The projector according to claim 7,
wherein the color separating and guiding optical system further includes a reflection-type polarizing plate, and the reflection-type polarizing plate transmits the first color light component or the second color light component from the first solid-state light source device, and reflects the yellow light.

10. The projector according to claim 9,
wherein the light modulation device is a reflection-type liquid crystal light modulation device.

11. The projector according to claim 1,
wherein a function is provided to remove the excitation light from light from the first solid-state light source device.

12. The projector according to claim 1, further comprising:
an excitation light reflection optical system separating light emitted from the fluorescent layer and excitation light emitted while being not converted by the fluorescent layer, and returning excitation light emitted while being not converted toward the fluorescent layer.

13. The projector according to claim 12, further comprising:
a collimation optical system parallelizing light emitted from the first solid-state light source device,
wherein the excitation light reflection optical system is located at the back of the collimation optical system.

14. The projector according to claim 12, further comprising:
a reflection-type polarizing plate directly transmitting one polarized component from among polarized components included in light emitted from the first solid-state light source device, and reflecting another polarized component toward the fluorescent layer,
wherein the reflection-type polarizing plate is disposed at the back of the excitation light reflection optical system.

15. The projector according to claim 1, further comprising:
a reflection-type polarizing plate directly transmitting one polarized component from among polarized components included in light emitted from the first solid-state light source device, and reflecting another polarized component toward the fluorescent layer.

16. The projector according to claim 15, further comprising:
a collimation optical system parallelizing light emitted from the first solid-state light source device,
wherein the reflection-type polarizing plate is located at the back of the collimation optical system.

* * * * *